United States Patent [19]

O'Brien

[11] Patent Number: 4,867,134
[45] Date of Patent: Sep. 19, 1989

[54] FLUID-HEATING SOLAR COLLECTOR

[76] Inventor: Philip T. O'Brien, 2100 Forest Ave., Belmont, Calif. 94002

[21] Appl. No.: 220,079

[22] Filed: Jul. 18, 1988

Related U.S. Application Data

[63] Continuation-in-part of Ser. No. 103,656, Oct. 2, 1987, abandoned.

[51] Int. Cl.[4] .................................................. F24J 3/02
[52] U.S. Cl. .................................... 126/449; 126/429; 126/432; 126/448
[58] Field of Search ............... 126/449, 429, 901, 417, 126/448, 432, 441, 450

[56] References Cited

U.S. PATENT DOCUMENTS

| | | | |
|---|---|---|---|
| 3,939,818 | 2/1976 | Hamilton et al. | 126/449 X |
| 4,038,969 | 8/1977 | Smith | 126/441 X |
| 4,073,282 | 2/1978 | Schriefer, Jr. | 126/441 |
| 4,243,021 | 1/1981 | Homsy et al. | 126/441 X |
| 4,265,222 | 5/1981 | Kapany et al. | 126/449 X |
| 4,316,449 | 2/1982 | Fodor | 126/449 X |
| 4,342,307 | 8/1982 | Tuck | 126/449 |
| 4,409,960 | 10/1983 | Balzer | 126/428 |

FOREIGN PATENT DOCUMENTS

| | | | |
|---|---|---|---|
| 2629086 | 1/1978 | Fed. Rep. of Germany | 126/449 |
| 2388220 | 11/1978 | France | 126/449 |
| 2073872 | 10/1981 | United Kingdom | 126/449 |

Primary Examiner—Robert E. Garrett
Assistant Examiner—Carl D. Price
Attorney, Agent, or Firm—T. R. Zegree

[57] ABSTRACT

A fluid-heating solar collector comprises a solar energy absorber with heat conducting and radiation absorbing material arranged to provide a plurality of angularly bent conduits extending therethrough thus to optimize the heat absorption surface at differing sun angles and also to substantially increase the area for convective heat transfer to passing air or other fluid.

9 Claims, 2 Drawing Sheets

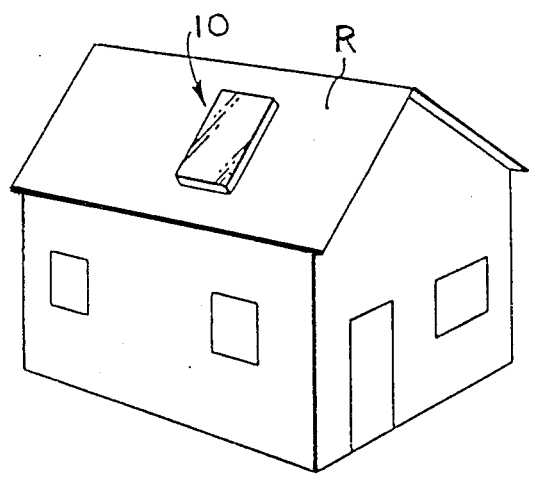
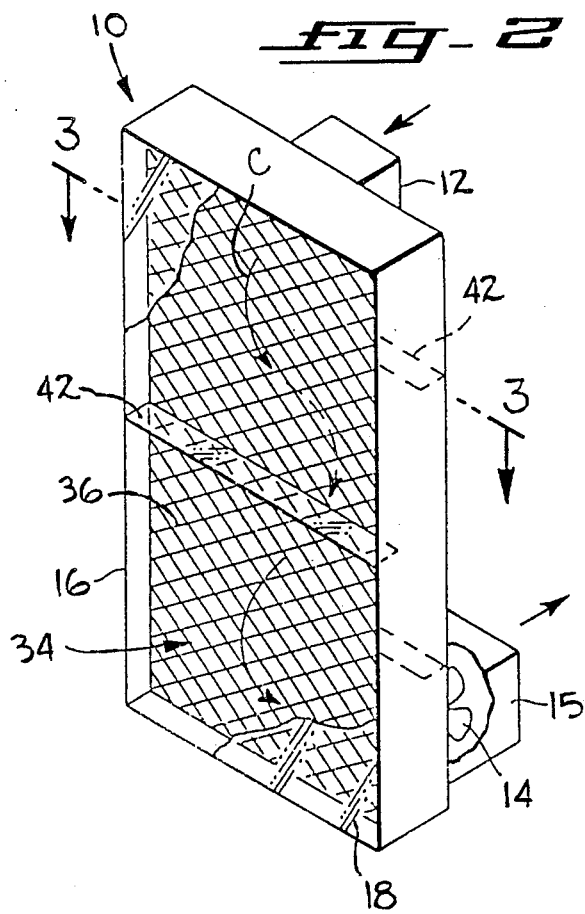
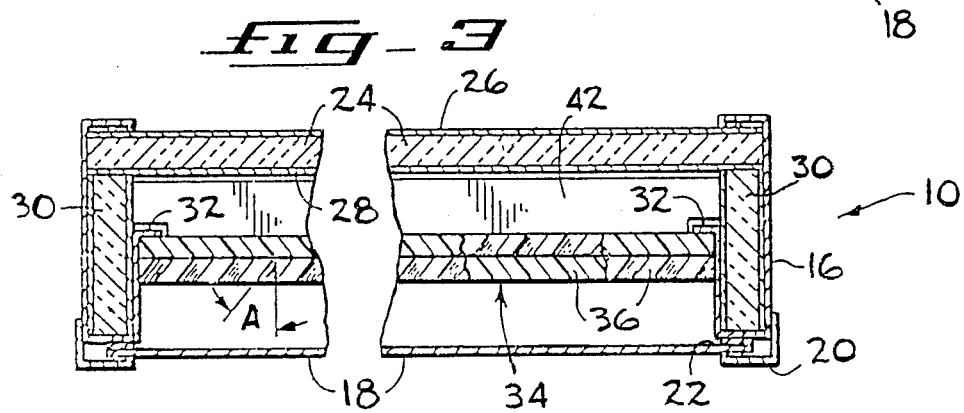
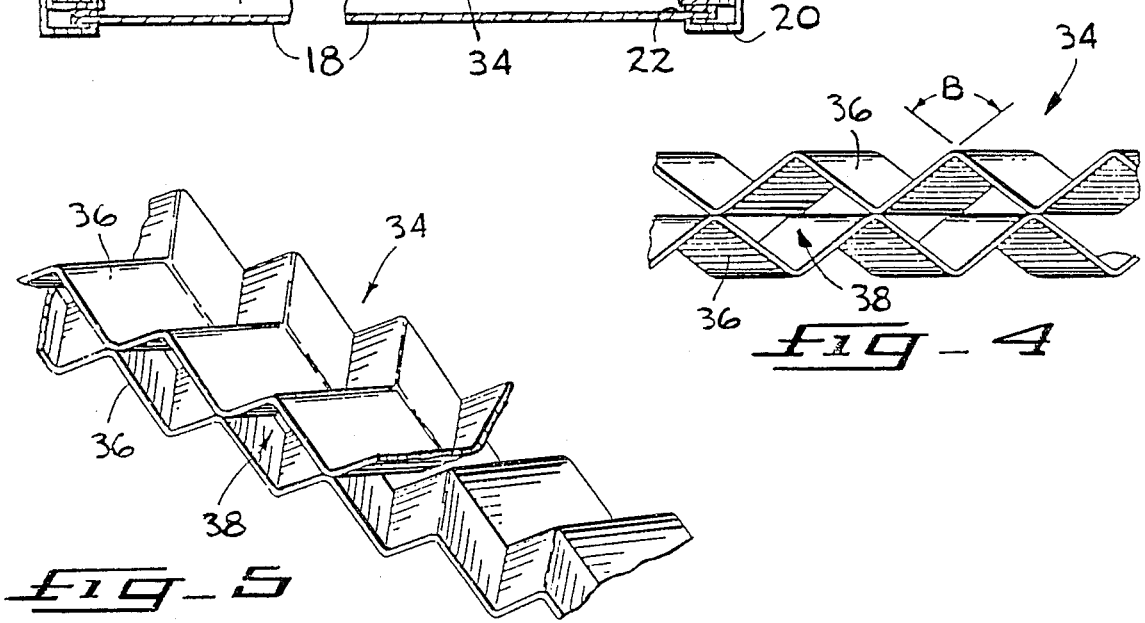

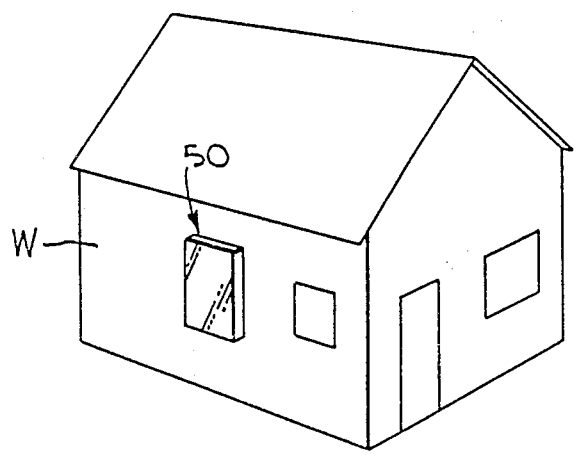
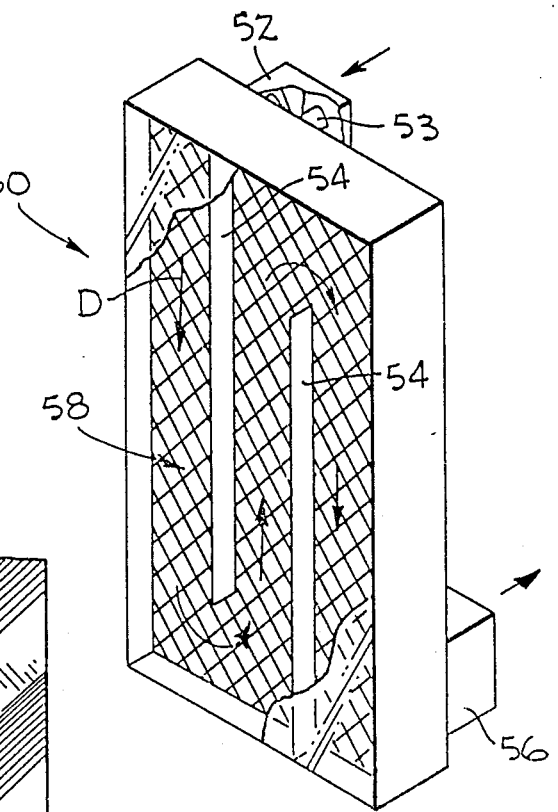
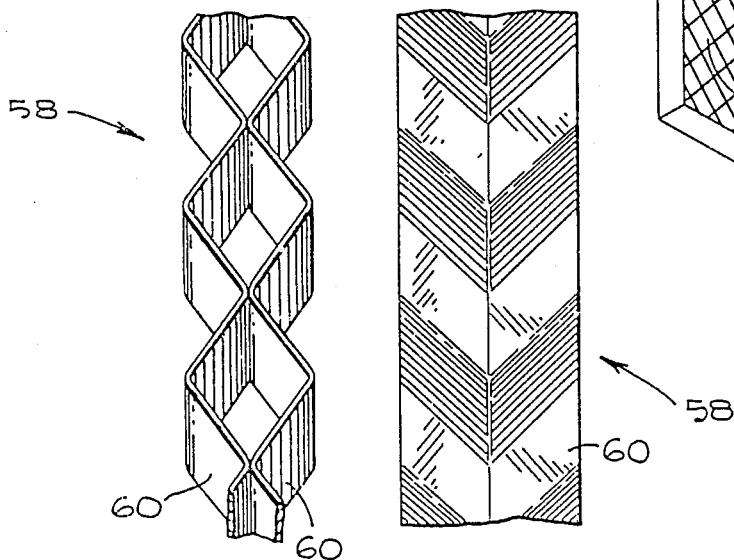

FLUID-HEATING SOLAR COLLECTOR

BACKGROUND OF THE INVENTION

The present invention is a continuation-in-part application of my application Ser. No. 07/103,656 filed Oct. 2, 1987, now abandoned.

The present invention relates generally to solar collectors and, more particularly, to a fluid-heating non-tracking solar collector including a solar absorber for receiving radiation and transferring the heat to air or other passing fluid.

As is well known, the conventional flat plate solar absorbers are limited in the total areas favorably inclined to sunlight and at the same time in the area exposed for heat transfer to air or other passing fluid. This has been improved in certain absorbers, for example, by providing corrugations, dimples, pockets or folds in the plate but limits on efficiency still exist. Moreover, orientation of the fixed absorbers to optimize absorption during different times of day has not been effectively achieved.

Various solar heating devices have been described in the prior art. For example, U.S. Pat. No. 4,223,665 to Lowe describes an array of conically-shaped tubular solar energy collectors. U.S. Pat. No. 4,262,659 to Brzezinski discloses a solar radiation absorbing panel having a flat base sheet provided with a plurality of rectangular tab members. U.S. Pat. No. 4,262,657 to McCullough et al. teaches a solar air heater comprising a flat, porous collector plate combined with a radiation trap. U.S. Pat. No. 4,360,006 to Warnock shows a radiant solar collector comprising a flat base plate to which are affixed semi-elliptical or oval absorbers in spaced relationship therefrom. U.S. Pat. No. 4,424,803 to Bogardus discloses a solar collector comprising a housing provided with a plurality of twisted heat-absorbing vanes. U.S. Pat. No. 4,668,443 to Rye, although not directed to solar heating, describes contact bodies formed by securing together a plurality of corrugated sheets provided with planar positioner pads for use in cooling towers and the like.

While the above-mentioned patents disclose various devices having specific structural arrangements, the present invention provides a new approach to the structural form of a solar collector which offers certain advantages over the prior art devices.

OBJECTS OF THE INVENTION

Accordingly, it is the general object of the present invention to provide a fluid-heating solar collector having a solar absorber which not only optimizes the area exposed to solar radiation during various daylight hours but also greatly increases the area for convective heat transfer to a passing fluid, such as air.

A further object of the invention is to provide a highly efficient solar collector comprising a solar energy absorber characterized by having novel undulating strips forming bent and partially obstructed conduits for passage of air or other fluid therethrough.

Still another object of the invention is the provision of a solar collector of the character described herein which can be manufactured at a relatively low cost from readily available materials.

These and other objects of the invention will become more fully apparent from the following description considered in conjunction with the accompanying drawings.

BRIEF SUMMARY OF THE INVENTION

In accordance with the invention, there is provided a fluid-heating solar collector which comprises an enclosed collector housing including a solar radiation transmitting side wall and an opposite radiation reflecting side wall mounted in spaced relation and parallel thereto. Substantially centrally between the two side walls is supported within the housing a solar absorber including a plurality of thin adjacent undulating strips of heat-conducting material arranged to form a plurality of open-ended conduits of specific configuration which will be described in more detail hereinafter.

BRIEF DESCRIPTION OF THE DRAWINGS

The stated objects of the invention and the manner in which it is achieved, as summarized above, will be more readily understood by reference to the following detailed description of two examplary embodiments of the invention shown in the accompanying drawings wherein like reference characters designate corresponding elements throughout the views thereof.

FIG. 1 is a general perspective view of a residence with a solar collector constituting one embodiment of the invention positioned on its roof.

FIG. 2 is an enlarged isometric view of the solar collector of FIG. 1.

FIG. 3 is an enlarged transverse sectional view taken along line 3—3 of FIG. 2.

FIG. 4 is a greatly enlarged fragmentary side elevational view of the solar absorber elements utilized in the first embodiment.

FIG. 5 is a fragmentary isometric view of the absorber elements of FIG. 4.

FIG. 6 is a perspective view of a residence with a solar collector constituting a second embodiment of the invention mounted in a vertical position on the residence wall.

FIG. 7 is an enlarged isometric view of the solar collector of FIG. 6.

FIG. 8 is a greatly enlarged fragmentary side elevational view of the solar absorber elements of the second embodiment, and FIG. 9 is a view taken from the right side of FIG. 8.

DETAILED DESCRIPTION OF THE INVENTION

With initial reference to FIG. 1, a solar collector 10 constituting one embodiment of the invention is mounted on the roof R of a residence facing the south side thereof in northern hemisphere. With additional reference to FIG. 2, a fluid inlet means 12 is diagrammatically indicated at the top of collector 10 and a fan 14 in the fluid outlet means 15 at the bottom of collector 10 creates an induced draft of air entering the top inlet means from the resience interior (not shown) into the lower discharge end of solar collector 10.

With yet additional reference to FIG. 3, solar collector 10 includes an open rectangular frame 16, the four walls of which are of the same construction. Frame 16 supports at its one edge a radiation transmitting horizontal side wall 18 composed of single or multiple glazing, preferably lightweight "TEDLAR" made by du Pont de Nemours Co. Side wall 18 is held firmly against the edge of frame 16 by a cap 20 with an interposed weather seal or gasket 22. At its opposite edge, frame 16 includes a second horizontal side wall 24 formed by a suitable heat-insulating material covered by thin metal foil sheets 26, 28, the inner foil sheet 28 providing a light-reflective surface. The other two side walls of frame 16 are made of preformed sheet metal structure filled inside thereof with heat-insulating material 30 likewise covered with thin metal foil sheets 26, 28. Frame 16 is provided with inwardly extending flange means 32 to support and secure a solar absorber 34 which spans from edge to edge of the opposite vertical walls of frame 16 of the collector's housing at a position centrally located between the side walls 18, 24 leaving spaces on either side of absorber 34.

In accordance with a primary aspect of the invention, absorber 34 consists of a plurality of horizontally extending heat-conductive and radiation-absorbing strips 36 of aluminum or other suitable material. Preferably, strips 36 are approximately 2-3 inches wide and 0.004-0.010 inch thick so that the entire absorber 34 is of minimal weight. With reference to FIGS. 4 and 5, each strip 36 is formed with longitudinally spaced alternate indentations and protrusions successively sloping upwardly and downwardly thus forming transversely a V-shaped angular configuration so that a longitudinal undulatory herringbone pattern is provided. Preferably, the angle A shown in FIG. 3 between a transverse line on each strip and one leg of the V is between 30° and 50° and, in turn, the included angle B shown in FIG. 4 formed by two adjacent legs of the V of each protrusion or indentation is between 90° and 120°.

The adjacent undulating strips 36 are disposed contiguously and attached to form angularly bent, diverging, non-rectilinear, turbulence-inducing passages or conduits 38 transversely extending in zigzag throughout the entire absorber 34 to optimize exposure to solar radiation at differing daylight hours. Adjacent strips 36 have their herringbone patterns inclined in opposite directions as best shown in FIGS. 4 and 5 but also indicated by the breakaway showing in FIG. 3. Air or other fluid introduced into the collector 10 is caused to pass through formed in zigzag passages or conduits 38 so that it is exposed to convective heat transfer through a greatly enlarged surface area, as compared to flat plate, for predetermined solar collector size. Also, bent conduits 38 create a turbulent flow which enhances the convective heat transfer.

A fan in the fluid inlet can create a forced fluid movement. A similar fan in the fluid outlet can, alternatively, create an induced fluid flow. Moreover, if the solar collector is disposed in a generally upright position, a natural fluid flow resultant from the generated heat can be utilized.

In one embodiment, adjacent strips, which are identical, can be reversed along their lengths producing partially obstructed conduits that optimize surface exposure to solar radiation when a sloping disposition of the collector exists, as on a sloping roof. In another embodiment, the adjacent strips present uniformly open conduits along their lengths, such arrangement being preferred when a vertical wall mount of the solar collector is desired. However, both arrangements induce turbulence to enhance the heat exchange with passing fluid.

Preferably the absorber surfaces of strips 36 are coated with dark material to approximate a "black body" and thus maximize absorption. A ½ mil coating of "Solar Coat 100" produced by Zuel Corporation is preferred to maximize absorptivity and reduce emittance of available solar radiation. The bending of conduits 38 is sufficiently great so that most of the straight line rays can not pass entirely through the conduits forming, in effect, a closed black body cavity or pocket so that little radiation escapes contact with the conduit walls. Any reflected rays are delivered to other surfaces and any radiation generated by the heated absorber strips is also re-radiated to adjacent strips thus effecting optimum cavity radiation and absorption of heat energy.

It will be observed that some of the angled surfaces will receive greater amounts of radiation during morning hours while other surfaces will receive more in the afternoon. In any event, at any time of day a greater area is continuously exposed to solar radiation than in conventional solar absorbers, such as of a flat or corrugated type, thereby increasing efficiency of the collector described herein. It will be also understood that maximum heat energy is generated when solar rays are perpendicular to the absorbing surfaces.

While the collector of this invention is light in weight and inexpensive to manufacture, the undlating and attached contiguous arrangement of the adjacent strips can provide structure integrity.

As previously mentioned, air enters through the upper end of absorber 34 and with the aid of draft induced by fan 14 passes downwardly therethrough to outlet means 15 arranged todeliver heated air into interior of the residence. As illustrated in FIG. 2, transparent baffles 42 are disposed in alternate positions on opposite sides of absorber 34 thus diverting the passing air through conduits 38 in a serpentine pattern, as indicated by arrows C, so that the baffled area of the conduit walls will realize a higher average fluid velocity to optimize the convective heat transfer. Furthermore, since conduits 38 are bent angularly forming zigzag turns in alternate directions and partially obstructed by the oppositely positioned rear portions of strips 36, turbulent air flow is generated in multi-directional pattern, thus further enhancing the heat transfer.

For installations in vertical positions, such as an exterior wall of a residence, a modified embodiment of the invention shown in FIGS. 6-9 is preferred. FIG. 6 illustrates a modified solar collector 50 which is suitably secured to the exterior wall W facing southerly direction. As shown in FIG. 7, a suitable conduit 52 provides air inlet means at the top of collector 50 so that cold air from the interior of the residence can be forced in a serpentine pattern indicated by arrows D around light-transmissive baffles 54 to air outlet conduit 56 at the bottom portion of collector 50 for discharge of heated air through wall W into the interior of the residence. Alternatively, a natural draft in the opposite direction can occur resulting from the heating of air so that the fan and the baffles can be eliminated.

The basic structure of solar collector 50 is similar to that of the collector 10 described in the first embodiment of the invention and thus it will not be repeated.

The solar absorber 58 is arranged differently, however. Absorbing strips 60 have the same herringbone pattern as those in the first embodiment, but extend vertically with all strips having the V's of the herringbone structure directed downwardly, as clearly shown in FIGS. 8 and 9. Such disposition of strips 60 enhances the reception of solar radiation on the vertically oriented collector 50. Additionally, less obstruction exists to air flow which facilitates the natural draft use.

It will be apparent from the foregoing description of the invention in its preferred embodiments that I have devised an improved solar collector characterized by novel construction of the absorber which gives, as a result, a markedly increased efficiency, as compared to solar collectors known in the prior art.

In addition to the principal use described hereinabove, my collector can effectively be employed for absorption of radiations other than solar.

It will be understood that the described embodiments of the invention are examplary and further modifications and/or alterations may be made without departing from the spirit of the invention and its actual scope as indicated only by the appended claims.

I claim:

1. A fluid-heating solar collector which comprises:
an enclosed collector housing including a solar radiation transmitting side wall and an opposite radiation reflecting side wall parallel thereto,
fluid inlet means to said housing,
fluid outlet means from said housing, and
a solar energy absorber supported within said housing between edges of said side walls and including heat-conductive and radiation-absorbing material comprising a continuous panel having a plurality of open-ended, bent in zigzag shape passages formed by adjacent pairs of heat-conductive, oppositely positioned strips having alternate V-shaped indentations and protrusions providing a regular, longitudinal, undulatory herringbone pattern extending substantially uniformly through the entire interior of said housing for passage of fluid flow through said passages, said strips being disposed continuously in planar configuration and having side walls extending at an inclination relative to said radiation transmitting side wall, said inlet and said outlet means being arranged to cause said fluid to flow through the zigzag shaped passages to thus provide heating of said fluid during passage thereof through said absorber.

2. A fluid-heating solar collector according to claim 1, wherein the herringbone pattern on adjacent strips extends in the same direction.

3. A fluid-heating solar collector according to claim 1, wherein the herringbone pattern on adjacent strips extends in opposite directions.

4. A fluid-heating solar collector according to claim 1, wherein said collector comprises a radiation-absorbing coating on said strips.

5. A fluid-heating solar collector according to claim 1, wherein the angle of each leg of said zigzag passages relative to a transverse line across said strip is between 30° and 50°.

6. A fluid-heating solar collector according to claim 1, wherein an included angle at an intersection of two leg portions of each of said zigzag shaped passages is between 90° and 120°.

7. A fluid-heating solar collector according to claim 2, wherein said fluid comprises air.

8. A fluid-heating solar collector according to claim 1, which comprises at least one transparent baffle extending from said absorber toward said radiation transmitting side wall for diverting said fluid passing through said passages in a serpentine pattern.

9. A fluid-heating solar collector according to claim 1, wherein said solar radiation transmitting side wall is composed of at least one single glazing and said second radiation reflecting side wall is formed of a layer of heat-insulating material covered by thin metal sheets on top and bottom thereof.

* * * * *

UNITED STATES PATENT AND TRADEMARK OFFICE
CERTIFICATE OF CORRECTION

PATENT NO. : 4,867,134
DATED : Sepember 19,1989
INVENTOR(S) : O'Brien

It is certified that error appears in the above-identified patent and that said Letters Patent is hereby corrected as shown below:

Column 4, line 21, "undulating" is misspelled;

line 23, "structure" should read --structural--;

line 27, "to" and "deliver" should be separated.

Column 5, Claim 1, lines 31 & 32 "continously" should read --contiguously--;

Column 6, Claim 7, line 23, "2" should read --1--.

Signed and Sealed this

Sixth Day of March, 1990

Attest:

JEFFREY M. SAMUELS

Attesting Officer

Acting Commissioner of Patents and Trademarks